W. D. WOOLLEY.
ENTRANCE FITTING OR PIPE CAP FOR ELECTRIC SERVICE PIPES OR CONDUITS.
APPLICATION FILED DEC. 29, 1913.
1,146,118.
Patented July 13, 1915.
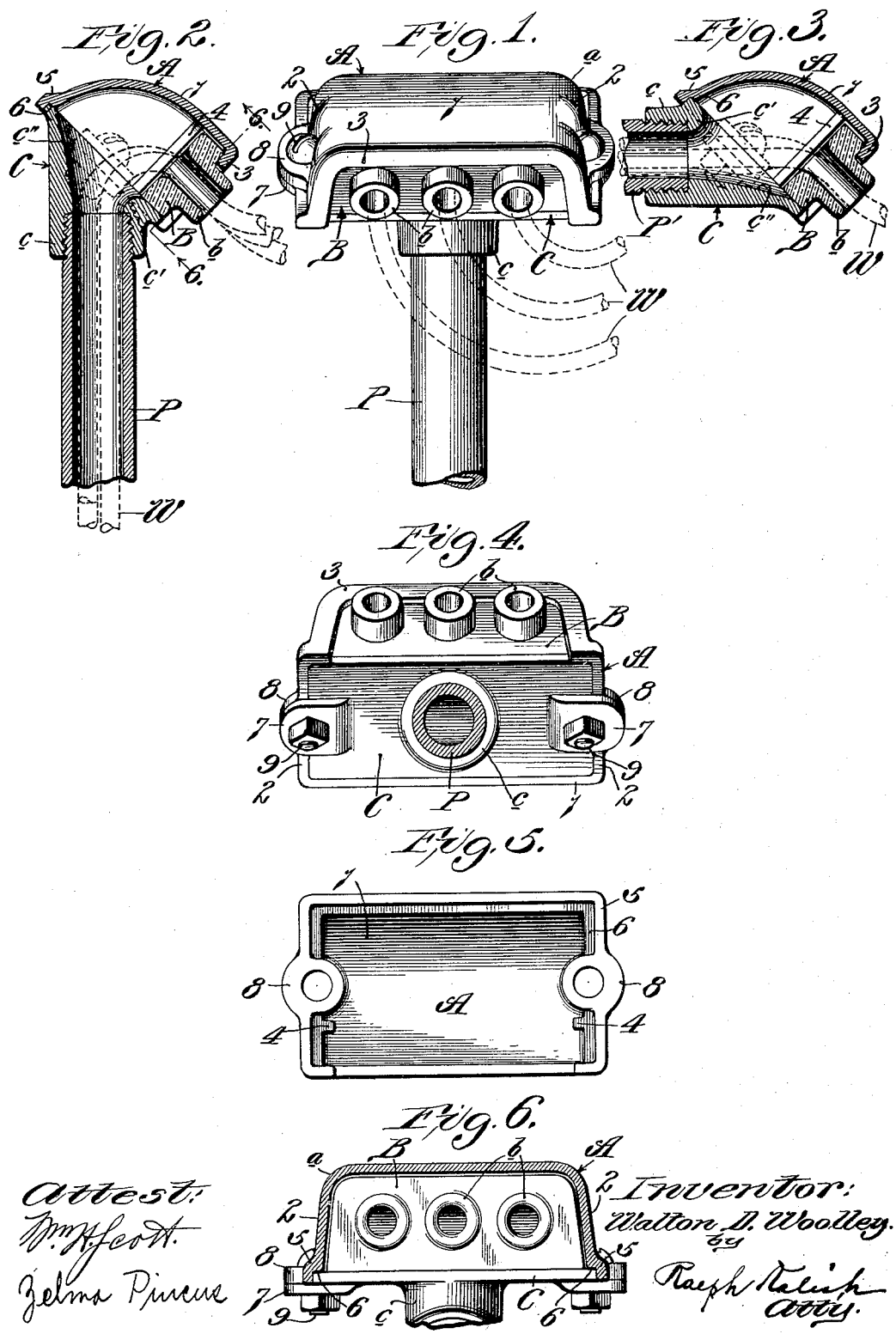

UNITED STATES PATENT OFFICE.

WALTON D. WOOLLEY, OF ST. LOUIS, MISSOURI, ASSIGNOR TO KILLARK ELECTRIC MANUFACTURING COMPANY, OF ST. LOUIS, MISSOURI, A CORPORATION OF MISSOURI.

ENTRANCE-FITTING OR PIPE-CAP FOR ELECTRIC-SERVICE PIPES OR CONDUITS.

1,146,118.  Specification of Letters Patent.  Patented July 13, 1915.

Application filed December 29, 1913. Serial No. 809,253.

*To all whom it may concern:*

Be it known that I, WALTON D. WOOLLEY, a citizen of the United States, residing at the city of St. Louis, State of Missouri, have invented certain new and useful Improvements in Entrance-Fittings or Pipe-Caps for Electric-Service Pipes or Conduits, of which the following is a specification, reference being had to the accompanying drawings, forming a part hereof, in which—

Figure 1 is an elevational view of my new entrance-fitting or pipe-cap operatively mounted upon a vertically-disposed electric service pipe or conduit; Fig. 2 is a vertical sectional view through the same and said conduit or pipe; Fig. 3 is a vertical sectional view through my new entrance-fitting or pipe-cap operatively mounted upon a horizontally-disposed conduit or pipe, the conduit or pipe being shown in longitudinal section; Fig. 4 is an inverted plan view, reference being had to Figs. 1 and 2, of my new entrance-fitting or pipe-cap, the pipe or conduit being shown in transverse section; Fig. 5 is an inverted plan view of the main or body-member of my new entrance-fitting or pipe-cap; and Fig. 6 is approximately a front elevational view of my new entrance-fitting or pipe-cap with the main or body-member thereof in section on the line 6—6, Fig. 2.

This invention relates to certain new and useful improvements in entrance-fittings or pipe-caps for electric service pipes or conduits. As is well known, the electric service wires for a building or structure usually enter or lead into the building from the main service lines through a short horizontally-disposed pipe or conduit which, at the convenience of the builder, is generally arranged in the wall of the building at a point either below, or at some distance above, the surface of the ground. In the former case, however, there is usually connected at one end by means of an elbow-joint or the like to the projecting outer end of the short horizontally-disposed pipe a vertically-disposed pipe or conduit into and through which the said wires are led to said horizontally-disposed pipe or conduit, this vertically-disposed conduit or stand-pipe being arranged closely adjacent the outer face of the wall of the building and having a length or height sufficient to prevent tampering with the wires by persons standing upon the surface of the ground. It is also well known that it is one of the requirements of the underwriters throughout the country that the several electric service wires, whether the wires be passed into or enter the building immediately or directly through a horizontally-disposed pipe or conduit or first through a vertically-disposed conduit or stand-pipe connected to, and forming substantially a continuation of, the horizontally-disposed pipe or conduit, be separated on going into, and in coming out of, such conduit or pipe.

The principal object of my invention is, therefore, to provide a device or pipe-cap which may be readily interchangeably employed or used in connection with, and by which the electric service wires may be held separated from one another on going into, or coming out of, either a horizontally-disposed conduit or pipe or a vertically-disposed conduit or pipe for electric service wires.

Other objects of my invention are to provide a device of the kind described of simple and inexpensive construction and of few, durable, and separable parts which may with ease be operatively detachably secured together; to provide a device of the kind described through which several electric wires may be conveniently led separated and insulated from one another and which may be quickly and with facility operatively mounted or arranged upon the service conduit or pipe; and to improve generally upon devices of the class stated.

With the above and other objects in view, my invention resides in certain novel features of form, construction, arrangement, and combination of parts, all as will hereinafter be described and afterward pointed out in the claims.

As shown in the accompanying drawings, in which like reference characters refer to like parts throughout the several views, my new entrance-fitting or pipe-cap comprises substantially three coöperating and separable parts or members, namely, a body-member A, which is preferably of suitable metal and in one piece, a member B, which is preferably of porcelain or other suitable insulation material, provided lengthwise thereof with preferably a plurality or row of perforated bosses or small tubular extensions or outlets *b* through which wires W may be passed or extend, and a plate-member C, which is also preferably of suitable metal, provided centrally with a tubular extension *c* projecting therefrom at an angle of 45°.

Member A, which is preferably open at its front and rear sides, has preferably three sides or walls, a convexed, somewhat or approximately arc-shaped main wall 1 and side walls 2—2 aproximately of segmental shape in outline, walls 2—2 at their curved or arc-shaped end merging into wall 1 preferably in a gentle curve or rounded corner, as at *a*, Fig. 1, and at their other or upper and forward ends being straight and flush, respectively, with the front and rear ends of wall 1. Wall 1 and side walls 2—2 at their front and upper ends, respectively, are inturned to provide a continuous, substantially widened U-shaped flange 3; and formed or provided on the inner face of side walls 2—2 and extending approximately parallel with the legs of U-shaped flange 3, are inwardly-projecting ribs 4, flange 3 and ribs 4 forming a slide-way interiorly of member A in which porcelain member B is adapted to removably operatively fit with its said perforated bosses *b* presented outwardly and with flange 3 overlying and protecting marginal portions thereof, as seen clearly in Fig. 4, member B, when in such position, providing a closure for the open front side of body-member A.

Wall 1 and side walls 2—2 at their rear and forward ends, respectively, are somewhat offset outwardly, as at 5, to provide preferably continuously therearound, as seen in Fig. 5, an interior shoulder, as at 6, which is adapted to afford a seat on member A for plate-member C, plate-member C being adapted, when in either of its reversible operative positions relatively to members A and B, reference being had to Figs. 2 and 3, to provide a closure for the open rear side of body-member A and fit within member A with its tubular extension *c* presented outwardly and its outer face substantially flush with the outer faces of the rear and forward ends of said wall 1 and side walls 2—2 of member A, as seen clearly in Fig. 4.

Preferably integral with member C is a pair of oppositely-disposed outwardly-extending ears 7—7, which are adapted to match or coincide with a pair of substantially similar ears 8—8 preferably integral with side-walls 2—2 of member A, ears 7—7 and 8—8 being perforated to receive bolts 9 or other fastening means, whereby member C may be detachably and separably secured operatively to member A in either of its reversible positions relatively thereto, member C, as will be seen, being adapted to reversibly or interchangeably fit in the seat provided therefor in member A, so that its said tubular extension *c* may be either rearwardly or forwardly angularly disposed relatively to said tubular extensions *b* of member B.

Should it be desired to employ my new pipe-cap or fitting on a vertically-disposed service conduit or stand-pipe, as, for instance, pipe or conduit P, see Figs. 1 and 2, then plate-member C and member A are detachably fastened together, as described, member B being operatively in its said slide-way and wires W having been led or passed through said outlets or perforated bosses *b* of member B into the chamber of member A and therethrough into and through tubular extension *c* of member C into pipe or conduit P, with said tubular extension *c* forwardly disposed at an angle approximately of 45° relatively to bosses *b*. Should it, on the other hand, be desired to employ or use my new pipe-cap or fitting in connection with a horizontally-disposed service conduit or pipe, as, for instance, conduit or pipe P', see Fig. 3, then plate member C and member A are similarly detachably fastened together, but with said tubular extension *c* of member C rearwardly disposed at approximately the same angle to said inlets or perforated bosses *b*. It will thus be clearly evident that members A and C are reversible through a half circle or arc of 180° relatively to each other and that hence my new pipe-cap may be easily interchangeably arranged or mounted either on a horizontally or a vertically disposed service conduit or pipe, outlets or perforated bosses *b* being outwardly and downwardly presented at an angle and convexed wall 1 of member A being uppermost when my new pipe-cap is fitted upon either of said service-conduits or pipes, whereby water or rain easily sheds therefrom and is prevented from entering the service conduits or pipes.

It will be observed that member C, when fastened to member A as described, provides or forms not only a retaining member for member B and a closure for the otherwise open side of the chamber of member A, but also a supporting member for the pipe-cap as a whole. So that no sharp angles or corners may be presented to wires W by member C and its tubular extension or inlet *c*, the material of member C is preferably cut away or rounded at the inner end of extension *c*, as at *c'* and *c''*, see particularly Figs. 2 and 3.

It will be seen that my new pipe-cap fulfils in every respect the objects hereinbefore stated, and it is to be understood that changes in the form, construction, arrangement, and combination in the several parts thereof may be made and substituted for those herein shown and described without departing from the nature and principle of my invention.

Having thus described my invention, what I claim and desire to secure by Letters Patent is:

1. In a pipe-cap, a hood-shaped body-member having an enlarged opening, and a plate-member having a tubular extension projecting integrally therefrom at an angle other than a right angle relatively thereto and adapted for engagement with a pipe or conduit, said body-member and said plate-member being separable from, and detachably reversible relatively to, each other and said plate-member being adapted, when in either of its operative positions relatively to said body-member, to flatwise fit in, and provide a closure for, said opening, substantially as described.

2. In a pipe-cap, a hood-shaped body-member having an enlarged approximately rectangular opening, and an approximately rectangular plate-member having a tubular extension projecting integrally therefrom at an angle other than a right angle relatively thereto and adapted for engagement with a pipe or conduit, said body-member and said plate-member being separable from, and detachably reversible relatively to, each other and said plate-member being adapted, when in either of its operative positions relatively to said body-member, to flatwise fit in, and provide a closure for, said opening, said body-member and said plate-member being reversible relatively to each other only when said members are separated from each other and said plate-member withdrawn from said opening, substantially as described.

3. In a pipe-cap, a hood-shaped body-member having an enlarged approximately rectangular opening, said body-member being provided internally with a plate-seat around said opening, and an approximately rectangular plate having a tubular extension projecting integrally therefrom at approximately an angle of 45° relatively thereto and adapted for engagement with a pipe or conduit, said body-member and said plate being separable from, and detachably reversible through an arc of 180° relatively to, each other and said plate being adapted, when in either of its operative positions relatively to said body-member, to flatwise fit within said body-member upon said seat and provide a closure for said opening, said body-member and said plate being reversible relatively to each other only when said members are separated from each other and said plate withdrawn from said body-member, substantially as described.

4. In a pipe-cap, a hood-shaped body-member having an enlarged approximately rectangular opening, said body-member being provided internally with a plate-seat around said opening, an approximately rectangular plate having a tubular extension projecting integrally therefrom at approximately an angle of 45° relatively thereto and adapted for engagement with a pipe or conduit, said body-member and said plate being separable from, and detachably reversible through an arc of 180° relatively to, each other and said plate being adapted, when in either of its operative positions relatively to said body-member, to flatwise fit within said body-member upon said seat and provide a closure for said opening, and means for detachably fastening said plate with its said extension to said body-member when in either of its said operative positions closing said opening, said body-member and said plate being reversible relatively to each other only when said members are separated from each other and said plate withdrawn from said body-member, substantially as described.

5. In a pipe-cap, a hood-shaped body-member having continuous approximately rectangular openings in two of its sides, an approximately rectangular member adapted to removably fit in said body-member and provide a closure for one of said openings, said closure-member being provided with an opening adapted to afford a wire-outlet from said body-member, an approximately rectangular plate having a tubular extension projecting integrally therefrom at approximately an angle of 45° relatively thereto and adapted for engagement with a pipe or conduit, said body-member and said plate being separable from, and detachably reversible through an arc of approximately 180° relatively to, each other and said plate being adapted, when in either of its operative positions relatively to said body-member, to flatwise fit within said body-member and provide a closure for the other of said openings in said body-member, and means for detachably fastening said plate with its said extension to said body-member when in either of its said operative positions relatively thereto, said plate when fastened to said body-member when in either of its said operative positions providing a retaining member for, and preventing the removal of, said first closure-member; substantially as described.

In testimony whereof, I have signed my name to this specification, in the presence of two subscribing witnesses.

WALTON D. WOOLLEY.

Witnesses:
 RUTH PETERSON,
 ZELMA PINCUS.

Copies of this patent may be obtained for five cents each, by addressing the "Commissioner of Patents, Washington, D. C."